United States Patent [19]

Gerlowski et al.

[11] Patent Number: 4,892,697
[45] Date of Patent: Jan. 9, 1990

[54] PROCESS FOR PREPARING MELT PROCESSED POLYKETONE-BASED BARRIER POLYMER MATERIALS

[75] Inventors: Leonard E. Gerlowski; John R. Kastelic, both of Katy, Tex.

[73] Assignee: Shell Oil Company, Houston, Tex.

[21] Appl. No.: 128,968

[22] Filed: Dec. 4, 1987

[51] Int. Cl.⁴ .............................................. B29C 71/02
[52] U.S. Cl. ..................................... 264/234; 264/235; 264/237; 264/331.15; 264/345; 264/346; 264/348
[58] Field of Search ................ 264/234, 235, 237, 345, 264/346, 348, 331.15

[56] References Cited

U.S. PATENT DOCUMENTS

| | | | |
|---|---|---|---|
| 2,495,285 | 1/1950 | Hoehn | 260/28.5 |
| 3,637,592 | 1/1972 | Ben et al. | 264/346 |
| 3,689,460 | 9/1972 | Nozaki | 260/63 |
| 3,694,412 | 9/1972 | Nozaki | 260/63 |
| 3,914,391 | 10/1975 | Nozaki | 423/364 |
| 4,287,149 | 9/1981 | Capaccio et al. | 264/234 |

FOREIGN PATENT DOCUMENTS

| | | |
|---|---|---|
| 0121965 | 10/1984 | European Pat. Off. . |
| 0181014 | 5/1986 | European Pat. Off. . |
| 59-133231 | 7/1984 | Japan ................................. 264/234 |
| 1081304 | 8/1967 | United Kingdom . |

OTHER PUBLICATIONS

"Novel Palladium (II)-Catalyzed Copolymerization of Carbon Monoxide With Monoxide With Olefins", Sen & Li, J. Am. Chem. Soc. 1982, 104, 3520–3522.

Primary Examiner—Hubert C. Lorin
Attorney, Agent, or Firm—Dean F. Vance

[57] ABSTRACT

A process for preparing a melt processed polymer material having improved oxygen, water or carbon dioxide barrier properties wherein a quantity of a linear alternating polymer of carbon monoxide and at least one ethlenically unsaturated hydrocarbon is melt processed to form a film, heated to a temperature ranging from about 2° C. to about 40° C. above the melting point of the polymer, and cooling the heated melt processed film at a moderate rate between about 6° C. and about 10° C. per minute.

7 Claims, 1 Drawing Sheet

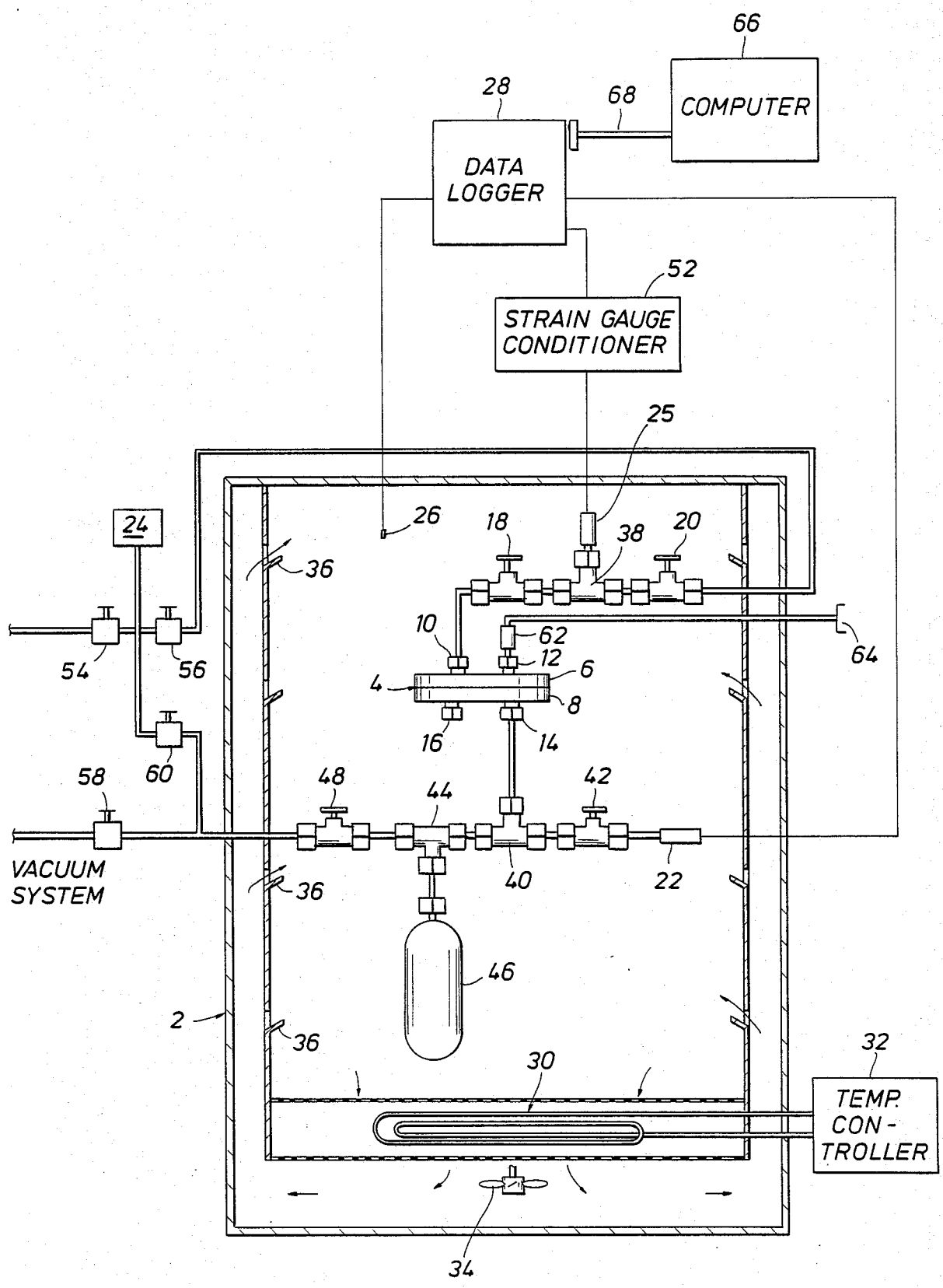

PROCESS FOR PREPARING MELT PROCESSED POLYKETONE-BASED BARRIER POLYMER MATERIALS

CROSS-REFERENCE TO SIMULTANEOUSLY FILED RELATED APPLICATIONS

"Heat Treated Solvent Cast Polyketone-Based Barrier Films", Leonard E. Gerlowski, Ser. No. 128,967, filed Dec. 4, 1987 (Attorney Docket No. T-4166); "Polyketone-Based Adhesives", Peter A Kinneberg, Thomas A. Armer, Adriaan Wouter van Breen, Roger Edgar Charles Barton, and Ebel Kei, Ser. No. 128,952, filed Dec. 4, 1987 (Attorney Docket No. K-4768); and "Laminar Structures Prepared With Polyketone-Based Structural Adhesives", Peter A. Kinneberg and Thomas A. Armer, Ser. No. 128,972 filed Dec. 4, 1987 (Attorney Docket No. K-4768 X (U.S.).

FIELD OF THE INVENTION

The invention relates to a polyketone-based polymer materials having oxygen, carbon dioxide and water barrier properties, to laminar structures, to articles prepared from these materials, and to a process for making these novel barrier materials.

BACKGROUND OF THE INVENTION

The general class of polymers of carbon monoxide and one or more ethylenically unsaturated hydrocarbons has been known for some years. Brukaker, U.S. Pat. No. 2,495,285, produced such polymers of relatively low carbon monoxide content in the presence of free radical catalysts such as benzoyl peroxide. British Patent 1,081,304 produced such polymers of higher carbon monoxide content in the presence of alkylphosphone complexes of palladium as catalyst. Nozaki extended the process to arylphosphone complexes of palladium; see, for example, U.S. Pat. No. 3,694,412, also see U.S. Pat. No. 3,914,391.

More recently, the class of linear alternating polymers of carbon monoxide and unsaturated hydrocarbons, now known as polyketones, has become of greater interest, in part because of improved methods of production. Such methods are shown by European Patent Applications 0,181,014 and 0,121,965. The disclosed processes employ, inter alia, a compound of a Group VIII metal such as palladium, an anion of a non-hydrohalogenic acid having a pKa below 2 and a bidentate ligand of phosphorus. The resulting polymers are generally high molecular weight thermoplastic polymers having utility in the production of articles such as containers for food and drink.

There are a variety of methods for preparing polyketones, copolymers of an olefinically unsaturated compound and carbon monoxide. U.S. Pat. Nos. 3,689,460 and 3,694,412 disclose two processes for preparing polyketones. The catalysts described therein are complexes of a palladium, chloride or allyl palladium chloride and two trihydrocarbyl phosphine monodentate-like ligands, such as triphenylphosphine. However, in these disclosed processes the polymer yields are relatively small, less than 35 grams per gram palladium per hour at a pressure of 70 bar. A need has existed to devise a process with a higher yield.

Another process for preparing polyketones is discussed by Sen and Li in an article entitled "Novel Palladium (II)-Catalyzed Copolymerization of Carbon Monoxide With Olefins", J. Am. Chem. Soc. 1982, 104, 3520-3522. This process generates higher yield than the other disclosed processes.

The process for preparing polyketones disclosed in European Patent Application No. 0121965 is directed towards a preparation of polyketones to obtain a high yield, by polymerizing a mixture of carbon monoxide and alkenically unsaturated hydrocarbon in the presence of a Group VIII metal catalyst containing ligands, wherein hydrocarbon groups are bonded to an element from Group Va, characterized in that, as catalyst, a complex compound is used that is obtained by reacting a palladium, cobalt or nickel compound, a bidentate ligand of the general formula:

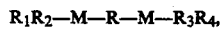

$$R_1R_2-M-R-M-R_3R_4,$$

in which M represent phosphorous, arsenic or antimony, $R_1$, $R_2$, $R_3$, and $R_4$ are identical or different hydrocarbon groups, and R represents a divalent organic bridging group having at least two carbon atoms in the bridge, none of these carbon atoms carrying substituents that may cause stearic hindrance, and an anion of an acid with a pKa of less than two, provided the acid is neither a hydrohalogenic acid nor a carboxylic acid.

Polyketones prepared by the above-described novel high yield process can be treated with one or more of a variety of solvents to produce solution cast films with barrier properties relative to the transmission of oxygen, carbon dioxide, and water.

SUMMARY OF THE INVENTION

This invention relates to (a) polymer materials having water, oxygen and/or carbon dioxide barrier properties prepared from a melt processed material comprising a linear alternating polymer of carbon monoxide and at least one ethylenically unsaturated hydrocarbon, (b) laminar structures prepared from these polymer materials, (c) articles prepared from these polymer materials, as well as, (d) a process for preparing these barrier materials.

BRIEF DESCRIPTION OF THE FIGURE

FIG. 1 is a diagram of the diffusion cell used to test the barrier properties of the novel polymer prepared herein.

DESCRIPTION OF THE INVENTION

Preferred polyketone polymers usable herein are copolymers of carbon monoxide and ethylene or terpolymers of carbon monoxide, ethylene and a second aliphatic β-olefin of 3 or more carbon atoms, particularly propylene.

Of particular interest are those polymers of molecular weight from about 1,000 to about 200,000, particularly those of molecular weight from about 10,000 to about 50,000, and containing substantially equimolar quantities of carbon monoxide and ethylenically unsaturated hydrocarbon.

Molecular weights for these polymers are determined by conventional NMR testing methods.

Useful polyketones for the novel films have limiting viscosity numbers (LVN) as measured by the method wherein the polymer is dissolved in metacresol at 60° C., using a standard capillary viscosity measuring device, such as a Cannon-Ubbelohde viscometer in the range of 0.5 to 10 LVN and more preferably 0.8 to 4 LVN and most preferably 0.8 to 2.5 LVN.

Polyketone polymers usable herein have preferred melting points of between about 210°-260° C. though polymers with melting points ranging from about 180° to about 280° C. may be usable herein.

Such polymers are typically produced by contacting the carbon monoxide and the ethylenically unsaturated hydrocarbon(s) under polymerization conditions in the presence of a catalytic amount of a catalyst formed from a compound of the Group VIII metals palladium, cobalt or nickel, the anion of a non-hydrohalogenic acid of a pKa less than about 6, preferably less than about 2, and a bidentate ligand of phosphorus, arsenic or antimony. Although the scope of the polymerization is extensive, for purposes of illustration, a preferred Group VIII metal compound is palladium acetate, the anion is the anion of an acid selected from trifluoroacetic acid and para-toluenesulfonic acid and the bidentate ligand is selected from 1,3-bis(diphenylphosphino)propane and 1,3-bis[di(2-methoxyphenyl)phosphino]propane.

Polymerization of these polymers are typically carried out at polymerization conditions, typically at elevated temperature and pressure, in the gaseous phase or in the liquid phase in the presence of an inert diluent, e.g., a lower alkanol such as methanol or ethanol. The reactants are contacted by conventional methods such as stirring or shaking and subsequent to reaction, the polymer product is recovered as by decantation or filtration. The polymer product may contain metallic residues from the catalyst which are removed by contact with a solvent which is selective for the residues.

The physical properties of the polymer are determined in part by the molecular weight and in part by whether the polymer is a copolymer or a terpolymer.

The structure of the preferred polymers is that of a linear alternating polymer of carbon monoxide, ethylene and any second ethylenically unsaturated hydrocarbon. When terpolymers of carbon monoxide, ethylene and a second ethylenically unsaturated hydrocarbon, (e.g., a hydrocarbon of at least 3 carbon atoms), are produced, there will be at least two units incorporating moieties of ethylene per unit incorporating a moiety of the second unsaturated hydrocarbon, preferably from about 10 units to about 100 units incorporating moieties of ethylene per unit incorporating a moiety of the second unsaturated hydrocarbon. The polymer chain of the preferred class of polymers is illustrated by the formula

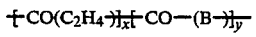

wherein B is the moiety obtained by polymerization of the second ethylenically unsaturated hydrocarbon through the ethylenic unsaturation. The

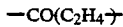

units and the

units occur randomly throughout the polymer molecule and the ratio of y:x is no more than about 0.5. in the modification of the invention which employs copolymers of carbon monoxide and ethylene without the presence of a second ethylenically unsaturated hydrocarbon, the term y=0 and the ratio of y:x is also 0.

When terpolymers are employed, i.e., y is greater than 0, ratios of y:x from about 0.01 to about 0.1 are preferred. The end groups or "caps" of the polymer chain will depend on the particular materials present during its production and whether and how the polymer has been purified. The precise nature of the end groups is of little significance with regard to the overall properties of the polymer so that the polymer is fairly represented by the polymer chain as depicted above.

The present invention relates to a barrier material prepared using the above-described polyketone polymers, and wherein the barrier material is capable of hindering the transmission of carbon dioxide, water, and/or oxygen. The present invention relates to an article of manufacture, prepared from the novel barrier polymer material and usable as a container for food. The invention relates to a process for preparing the barrier material by first heating an alternating copolymer of carbon monoxide and an ethylenically unsaturated compound to a temperature 5°-15° C. above the melting point of the polymer, and cooling the heated polymer at a moderate cooling rate. Optionally, the polymer can be heated a second time to a temperature just below the melting point of the polymer and then cooled at a moderate rate.

To determine the unique nature of the polymer material, Dr. Don Paul of the University of Texas and Shell Oil Co., USA, developed a test for determining oxygen, carbon dioxide and water transmission through various films.

The test involves a unique device, shown in FIG. 1 to provide means for accurately measuring the transport properties of gases through polymer films.

The system hardware consisted of tubing, valves, known volumes, and the diffusion cell. The hardware was mounted in a Precision Thelco Model 18 forced air oven, 2, which provided a constant temperature air bath. All of the valves mounted inside the oven compartment were Nupro "H" bellows valves. These valves were chosen to eliminate the possibility of leaky valve packings as well as to provide complete shutoff. The fittings used to make tubing connections were Cajon VCR fittings that employed a stainless steel gasket to form the seal. The tubing used was standard ¼ inch outer diameter (o.d.) stainless steel tubing that was silver soldered to the VCR connectors. The silver solder joints were coated with "five minute" epoxy resin to insure a gas tight seal. The cell supported a film such that a constant high pressure test gas could be applied to one side of the film. The low pressure side of the film was designed such that pressure in a calibrated volume was measured over time. The cell 4 was constructed of two stainless steel disks 6, and 8 that bolted together much like a flange. Two viton "O" rings effectively isolated the diffusion cell cavity from the outside world on the upper (high pressure) side to the film. The lower half of the cell had a fritted metal disk for support of the film and for gas to transport to a temperature), cooling air was supplied by passing air through a coil of copper tubing located in the refrigeration bath and out through an insulated line leading to the oven compartment.

The other controlled parameters were the upstream and down stream volumes. The upper manifold consisted of a ¼ inch outer diameter (o.d.) stainless steel tube that was connected to one of the two ports in the top of the cell. The line entered the right side of the oven and connected to a valve (V4). This valve acted as the main isolation valve for the high pressure side. The outlet of valve V4 was connected to a "T". One leg of the "T" lead to the strain gauge transducer. The other leg of the "T" was connected to a valve (V3). These two valves allowed the transducer to be isolated (and calibrated) while a run was in progress. The outlet of valve (V3) lead directly to the upper cell. A 1000 psi rupture disk was attached to the other port on the upper cell. The film to be measured in the cell acted as the final "barrier" separating the upper and lower volumes. The lower volume consisted of ¼ o.d. stainless steel tube attached to one of the two ports on the lower cell that lead to a "T". One leg of the "T" lead to valve (V2), the outlet of which was attached to the Baratron gauge. This valve was used to isolate the gauge during removal of the cell. The other leg of the "T" was connected to a ¼ o.d. line that lead to another "T". One leg of this "T" is attached to a 300 cc pressure vessel acting as a ballast volume. The other leg of the "T" was connected to a line which lead to valve (V1). The outlet of this valve (V1) lead to the vacuum manifold and served as the isolation valve for the lower cell volume. The total volume of lower cell between valve V1 and the membrane was about 329.0+0.1 cc.

The experimental data from the cell was received and recorded by a Kaye Digistrip 4. Information in the form of voltage signals was input to the logger from thermocouples and transducers and was further manipulated by programming the logger to perform the calculations thermocouples, 26, whose signals were detected and recorded by a Kay Instruments Digistrip 4 data logger 28. The oven contained a 1100 watt radiant heater 30 which was controlled by a Barber Coleman PID temperature controller 32. A forced air blower 34 brought air from the oven compartment, past the heater in the bottom, and returned the air through louvers 36 in the sides of the oven. When operating at a temperature close to or below ambient temperature, (room temperature), cooling air was supplied by passing air through a coil of copper tubing located in the refrigeration bath and out through an insulated line leading to the oven compartment.

The other controlled parameters were the upstream and down stream volumes. The upper manifold consisted of a ¼ inch outer diameter (o.d.) stainless steel tube that was connected to one of the two ports in the top of the cell. The line entered the side of the oven and connected to a valve 20. This valve 20 acted as the main isolation valve for the high pressure side. The outlet of valve 20 was connected to a "T" 38. One leg of the "T" lead to the strain gauge transducer 25. The other leg of the "T" was connected to valve 18. These two valves allowed the transducer to be isolated (and calibrated) while a run was in progress. The outlet of valve 18 lead directly to the cell 4 through port 10. A 1000 psi rupture disk 62 was attached to port 12 on the cell 4. The film to be measured in the cell acted as the final "barrier" separating the upper and lower volumes. The lower volume of the cell 4 consisted of a ¼ o.d. stainless steel tube attached to port 14 at the one end and on the other end, a "T" 40. One leg of "T" 40 lead to valve 42 the outlet of which was attached to the Baratron gauge 22. This valve 42 was used to isolate the gauge during removal of the cell. The other leg of the "T" 40 was connected to a ¼ o.d. line that lead to another "T" 44. One leg of this "T" 44 was attached to a 300 cc pressure vessel 46 acting as a ballast volume. The other leg of the "T" 44 was connected to a line which lead to valve 48. The outlet of this valve 48 lead to the vacuum system 50 and served as an isolation valve for cell 4. The total volume of lower cell valve 48 and the membrane in cell 4 was about 329.0+0.1 cc.

The data was received and recorded by a Kaye Digistrip 4 indicated as 28. Information in the form of voltage signals was input to the logger from thermocouples 26 and transducer 25 (optionally manipulated by a strain gauge conditioner 52) and was further manipulated by programming the logger to perform the calculations necessary to present the data in a usable form. Internal timers allowed data to be recorded and transmitted at any rate limited only by the amount of time needed to scan the input banks (approximately 1 sec). The logger was directly wired to an IBM personal computer 66 via a cable 68. KDAWS, a software package supplied by Kaye Instruments allowed data to be transferred to the IBM for archiving and further manipulation by LOTUS 123 software. Additional valves 54, 56, 58, and 60 can be used in this diffusion cell. Cell 4 can be vented through port 12 to an opening 64 through a rupture disc 62.

Polymer films to be measured on this equipment were about 3 inches in diameter and between 1 and 30 mils thick, with only minor variations in thickness. Prior to placing the film in the uniquely designed diffusion cell, an area for diffusion was defined by masking a portion of the test film with an adhesive backed aluminum foil. Mocon Inc. supplies masks with cut-outs of 5 square centimeters (part number 130-015:02). Before attaching the mask to the film, a circle was scribed on the mask that was 3.0 inches in diameter. The mask was then attached to the film (in such a manner as to prevent air from being trapped between the film and the mask). The masked film was then trimmed such that it fit inside the outermost groove of the upper cell. This assembly allowed the "O" ring to seal entirely on the film surface. With the two halves of the cell separated, the masked film was placed in the upper half such that the unmasked side of the film resting against the "O" ring. The film was centered such that the edges did not overlap the 0.002 inch step in the cell. A piece of perforated filter paper was cut to fit the circle in the foil mask. This protected the film by preventing it from being deformed by the metal frit on the lower cell. The bottom half of the cell was placed on the upper half ensuring that the masked film and filter paper support remained in their proper orientation. The cell was then assembled by bolting the halves together. Once bolted together the cell was then mounted in an oven and connected to the appropriate manifolds. The cell and membrane were then degassed by pulling a vacuum on the entire system for one to two days prior to performing the desired measurement. Prior to making a measurement, the pressure measuring devices were calibrated.

Although the system was designed to be very tight with respect to leaks from the outside, leaks on the order of 1 to 2 microns Hg per hour at 35° C. sometimes occurred. This level of leaking could cause error in the permeation calculation of barrier polymers. To account for this leak rate in the calculation, a leak test was made for a suitable length of time. A leak rate was measured by isolating the upper and lower portions of cell 4 shown in FIG. 1 from the vacuum system by closing valves 48 and 20. The run was begun by engaging the elapsed timer and recording the lower cell pressure increase as a function of time. The slope of the curve generated by plotting lower cell pressure against time was the leak rate. This plot resulted in a straight line.

Significant curvature could indicate cell contamination or polymer degradation. This value for the leak rate (units of mm Hg/Hour) was used to automatically correct the lower cell pressure value for leaking from the outside.

In making a diffusion measurement, the lower cell volume of cell 4, lower cell 6 was isolated from the vacuum source by closing valve 48. The system timer was engaged. The upper cell of cell 4, 8 was isolated by closing valve 60. The test gas was introduced slowly to the upper cell by throttling valve 54. When the desired pressure was reached, the gas source was isolated and valve 20 was closed to isolate the system.

This system measures permeation and diffusion of carbon dioxide an oxygen through polymeric films. If this transport is assumed to be Fickian diffusion, then the time dependent diffusion through the film should follow Fick's equation in one dimension assuming a linear sorption isotherm C=SP where S=solutiblity coefficient and P=pressure:

$$\frac{dc}{dt} = \frac{d}{dx}\left(D\frac{dc}{dx}\right) \quad (1)$$

where c is the gas concentration in the film, t is time of experiment, x is distance along the film, and D is the diffusion coefficient.

For experimental conditions, the initial condition was zero concentration throughout the film, $$t < 0, 0 < x < 1 \; c = 0 \quad (2)$$

(where l was the thickness of the film.)

The boundary conditions were constant concentration ($C_0$) on the upstream side and known (measured=f(t)) concentration on the downstream side of the membrane:

$$t > 0, x = 0 \; c = C_0 \text{ or } SP_o \quad (3)$$

$$t > 0, x = 1 \; c = f(t) = 0 \quad (4)$$

The solution to Fick's equation is well known. The flux (Q) i.e. the total amount of material which has passed through the membrane in time t, through the film is given by the equation:

$$\frac{Q}{lC_0} = \frac{Dt}{l^2} - \frac{1}{6} - \frac{2}{\pi^2} \sum_{1}^{\infty} \frac{(-1)^n}{n^2} \exp(-Dn^2\pi^2 t/l^2) \quad (5)$$

From this equation, the diffusion coefficient can be estimated from a 'time lag'. For long times, equation (5) reduces to a steady-state flux ($Q_{ss}$). The time axis intercept of the steady-state part of this solution is the 'time lag' theta ($\theta$). Theta can be used to determine the diffusion coefficient.

$$\theta = l^2/6D \quad (6)$$

The permeation coefficient (P) is the steady-state flux from this curve $$PP_o/l = \frac{dQ}{dt}\bigg|_{ss}$$

$$P = \frac{Q_{ss}l}{P_o} => P = \frac{l}{P_O} \frac{dQ}{dt}\bigg|_{ss} \quad (7)$$

where $P_o$ is the high pressure value. By definition, the sorption coefficients can be calculated from these two values $$S = P/D \quad (8)$$

In calculating the data, a line drawn along the constant slope portion of the curve to the time axis gives the time lag intercept. The flux is measured from the slope of this straight line. The above-described test methods were used to determine the barrier properties of films and materials discussed herein.

Using the test method described herein, the permeability of a variety of polyketone polymers were measured. Each of the copolymers and terpolymers were produced in the presence of a catalyst composition formed from palladium acetate, the anion of trifluoroacetic acid and 1,3-bis[di(2-methoxy-phenyl)phosphino]propane.

TABLE I

| Polymer | P-Oxygen[6] | P-Carbon Dioxide[6] | P-Water[6] |
|---|---|---|---|
| PET[1] | 8.5 | 25 | 3 |
| BAREX[2] | 1.8 | 9.0 | 5 |
| SARAN-H—B[3] | 0.5 | 1.9 | 0.2 |
| EVAL-F[4] | 0.1 | 1.0 | 1.4 |
| Carilon[5] polyketone | 4.5 | 21.7 | 12.1 |

[1]Polyethylene terphthalate available from National Bureau of Standards commercially available as Mylar from DuPont
[2]Available from British Petroleum
[3]Available from Dow Chemical Company
[4]Ethylene vinyl alcohol
[5]Polyketone terpolymer with 218 m.p. made by Royal Dutch Shell where the polymer was heated to 20° C. above its melt point and quickly cooled after molding (at a rate of about 20–40° C. per minute).
[6]Permeabiiity determined by Shell test described above wherein:
P = permeability coefficient cm³ (STP) - mil/100 sqin-d-atm.

Film samples of CARILON ™ Polymer produced in this manner are referred to herein as standard molded polymers. Standard molded films produced with this technique were measured for gas permeability and are summarized in Table II–III. As these measurements show, values of standard molded polyketone copolymers and terpolymers (m.p. 218° C.) have oxygen permeability values of 4.23 and 3.58 cc(STP)-mil/100sqin-d-atm at 30° C., carbon dioxide permeability values of 21.7 and 27.4 cc(STP)-mil/100sqin-d-atm at 30° C., and water vapor permeation values of 12.1 and 4.4 gm-mil/100sqin-d at 100° F. and 90% RH, respectively. The permeation values of the polyketone polymers measured at the given temperatures, can be compared with other commercially available products. At 30° C., SARAN ™ has an oxygen permeability of 0.5 and EVA 0.05 cc(STP)-mil/100sqin-d-atm. At 100° F. and 90% RH, SARAN ™ has a water vapor permeability of 0.05, and for polypropylene the water permeability value is 0.53 gm-mil/100sqin-d.

TABLE II

| Polymer | Water Transport Parameters | | | |
|---|---|---|---|---|
| | Tm | LVN/60 | P[1] | D[2] | S[3] |
| Polyketone-Ethylene Copolymer (054/005) 0% P | 218° C. | 1.46 6.61 | 24.5 | 4.8 | 27.9 |

TABLE II-continued

| Polymer | Water Transport Parameters | | | | |
|---|---|---|---|---|---|
| | Tm | LVN/60 | P[1] | D[2] | S[3] |
| Polyketone-Ethylene-Propylene Terpolymer (055/022) 4.7% P | 223° C. | 2.0 4.65 | 4.59 | 0.75 | 27.9 |
| Polyketone-Ethylene-Propylene terpolymer (055/012) 8.5% P | 206° C. | 1.37 5.11 | 4.72 | 0.92 | 23.4 |
| Polyketone-Ethylene-Propylene terpolymer (055/023) 10.5% P | 192° C. | 1.01 | 3.73 | 0.79 | 21.5 |
| Polyvinyl Chloride[4] | | | 1.0 | 2.13 | 1.8 |
| Saran-H—B[5] | | | | 0.38 | |
| EVAL-F[6] | | | 87 | 1.0 | 36.0 |
| Polypropylene[7] | | | 0.317 | 23.3 | 0.062 |

[1]P = permeability coefficient cm$^3$ (STP)-mil/100 sqin-d-atm; wherein D, S, and P are related by P = DS
[2]D = diffusion coefficient $10^{-9}$ cm$^2$/s
[3]S = sorption coefficient (level of dissolved gas at equilibrium) cm$^3$ (STP)/cm-cm Hg
[4]Available from Dow Chemical Co.
[5]Available from Dow Chemical Co.
[6]Ethylene vinyl alcohol copolymer available from EVALCA Co.
[7]DS-5C08 available from Shell Chemical Company, USA through Seadrift Polypropylene Plant

TABLE III

| Sample | LVN* | Water Vapor Transmission Rates | | | | | | |
|---|---|---|---|---|---|---|---|---|
| | | Thickness | 15° C. | 20° C. | 25° C. | 30° C. | 35° C. | 40° C. |
| Polyketone[1] Terpolymers | | | | | | | | |
| 5% C$_3$ 055/014 | 1.9 | 10.9 | 2.14 | 3.28 | 5.23 | 7.69 | 11.0 | 18.3 |
| 8.9% C$_3$ | | | | | | | | |
| 055/012 | 1.37 | 8.8 | 2.07 | 3.30 | 5.42 | 8.10 | 12.0 | 17.5 |
| 055/012 | 1.37 | 8.8 | 2.38 | 3.88 | 6.23 | 9.44 | 13.8 | 20.0 |
| 055/031 | 1.30 | 8.8 | 2.77 | 5.32 | 7.29 | 10.3 | — | 15.7 |
| 055/031 | 1.30 | 6.2 | 1.65 | 3.74 | 5.89 | 8.40 | — | 13.6 |
| Polyketone[2] Copolymers | | | | | | | | |
| 055/010 | 2.2 | 10.3 | 2.53 | 3.97 | 6.15 | 8.67 | 12.3 | 17.1 |
| 055/010 | 2.2 | 10.3 | 3.28 | 5.18 | 8.04 | 11.4 | 16.0 | 22.1 |
| 054/005 | 3.3 | 12.5 | 5.48 | 8.65 | 13.4 | 19.5 | 27.2 | 38.8 |
| 055/004 | 1.0 | 7.8 | 2.49 | 3.72 | 5.49 | 7.44 | 10.5 | 14.2 |
| 055/004 | 1.0 | 7.8 | 2.37 | 3.63 | 5.22 | 7.59 | 9.77 | 13.1 | all permeability values in units of gm-mil/l00sqin-d
*limiting viscosity number
[1]Polyketone-ethylene-propylene terpolymers comprising 5% C$_3$ 45% C$_2$
[2]Polyketone-ethylene copolymer comprising 50% ethylene comonomer

TABLE IV

| Gas Transport Properties of Carbon Dioxide in Several Polymers | | | |
|---|---|---|---|
| Polymer | D | S | P |
| Polyketone terpolymer[1] | 0.64 | 0.037 | 39.4 |
| Saran-H—B[2] | 3.02 | 0.0004 | 1.91 |
| EVAL-F[3] | 0.42 | 0.0001 | 0.05 |
| Polyethylene terephthalate[4] | 15.1 | 0.0026 | 64.6 |
| Polyvinyl chloride[5] | 2.09 | 0.0043 | 15.1 | note: values not corrected for crystallinity units at 25° C.
D - $10_3^{-9}$ cm$^2$/s
S - cm$_3$ (STP/cm$^3$—cm Hg
p - cm (STP)-mil/100 sqin-d-atm
[1]Polyketone-ethylene-propylene terpolymer with 218 m.p. made by Royal Dutch Shell
[2]Available from Dow Chemical Co.
[3]Ethylene vinyl alcohol copolymer available from EVALCA Co.
[4]Film from National Bureau of Standards commercially available from DuPont
[5]Available from Dow Chemical Co.
HAX8731602

Beneficial physical and barrier properties for certain polyketone polymer materials have been developed with a novel heat treatment and cooling process. Heat treatment increases the crystallinity of the film thereby reducing oxygen, water and carbon dioxide transmission through the film.

It has been discovered that by heat treating polyketone polymers by compression molding to temperatures ranging from 5°-25° C. above the melting point of the copolymers or terpolymers, then cooling at a moderate rate, the result is a polyketone material with improved barrier properties for oxygen, carbon dioxide and water transmission. A second heat treatment can be employed after this first heat treatment using, for example, an infra red oven. The second heat treatment can involve heating the film to a temperature in the range from the melting point of the polymer to about 20° C. below the melting point of the polymer then cooling the film at a moderate rate.

A variety of thermal treatment protocols were explored and are described in Table V along with the resulting films measured permeability and first heat of fusion as determined from a differential scanning calorimeter. Three thermal treatment protocols were used (i) forging-pressing of films at high pressure in the range of about 100 to about 1500 psi and heating to a temperature below the melt temperature of the polymer; (ii) compression molding-pressing of films, powder, or nibs at pressures less than about 100 psi and heating to a temperature 5°-25° C. above the melt temperature of the polymer; and (iii) annealing-heating the film to a temperature in the range from the melt temperature of the polymer to 20° C. below the melt temperature, without the imposition of pressure. All thermal treatment protocols caused controlled melting and re-crystallization. Forging near melting imposed the additional conditions of mechanical deformation by forcing the polymer to flow in the solid state. Forging has been found to be unsuccessful for making the novel barrier materials. Compression molding cycles are designed to explore the influence of cooling rate and isothermal annealing alone or in combination with controlled (time-temperature) partial melting. In these thermal treating experiments, one batch each of polyketone-ethylene copolymer (056/001 m.p. 256° C.) and polyketone-ethylene-propylene terpolymer (86/005 m.p. 218° C.) were used. Cooling at different rates was also carried out on the polymers. Both batches of polyketone polymer were prepared for testing using treatment protocols which are detailed on the following Table V.

Polyketone polymer powder (20 grams) was placed between chrome-plated metal sheets in a compression mold to form a plaque. The compression mold was preheated for about 1 minute. The sample was held at a designated temperature, usually about 2°–40° C. above the melting point of the polymer, for 1 minute. The mold was degassed by releasing the gases from the mold. After degassing, the polymer was held for an additional minute at designated temperature. The sample was cooled in the compression mold at a predetermined cooling rate using an air bath, water bath, ice bath, or combination these, to obtain a polymer temperature below the melting point of the polymer. The sample was removed from the compression mold, for further cooling. The additional cooling was accomplished using a water bath or ice water or by disposing the sample between metal plates or between an insulating media, such as TEFLON TM, to bring the sample to an ambient temperature. In some situations the polymer material was heated a second time, at temperatures ranging from the melting point of the polymer to about 40° C. below the melting point of the polymer.

TABLE V

Thermal Treatments on Polyketones

| Polymer | Treatment Protocol[1] | $O_2$[2] | $CO_2$[2] | WVTR[3] | H(1)[4] |
|---|---|---|---|---|---|
| Polyketone terpolymer 86/005 (mp 218°C.) | | | | | |
| | CM 250° C., QC | 2.47 | — | 9.11 | — |
| | CM 250° C., QC, FA at 207° C., C 30 sec, AC | 2.76 | — | 11.6 | — |
| | CM 250° C., QC, FA at 207° C., 30 sec, O/NC | 5.46 | — | 13.3 | — |
| | CM 225° C., A/WC | 2.42 | | | |
| | CM 230° C., A/WC | 1.41 | | | |
| | CM 240° C., A/WC | 2.43 | | | |
| | CM 230° C., AC | 1.78 | 8.4 | 6.8 | 23.1 |
| | CM 230° C., O/NC | 2.24 | 11.4 | 6.0 | — |
| | CM 220° C., AC | 4.95 | — | 14.3 | — |
| | CM 250° C., QC | 5.18 | — | 9.1 | — |
| | CM 250° C., A/WC | 2.63 | — | 8.5 | — |
| | | 3.33 | — | 10.3 | — |
| | CM 250° C., AW/C to 200° C., hold 5 min, RC | 4.37 | — | 10.4 | — |
| | CM 250° C., AW/C to 175° C., hold 5 min, RC | 5.51 | — | 0.0 | — |
| | CM 250° C., A/W to 220° C., hold 5 min, O/NC | 2.68 | — | 8.28 | — |
| Polyketone copolymer 056/001 (mp 256° C.) | | | | | |
| | CM from powder | 1.92 | | | |
| | 270° C., A/WC | 1.78 | | | |
| | Cm injection molded plaque at 265° C., 1 min. | 0.77 | | | |

FA = Flash annealed = Plaque heated quickly for 1 min in a compression molding press
CM = Compression molded = Formed from powder or nibs in press at high high pressure (for Carilon-E, formed under vacuum to attempt to reduce degradation
A = Annealed = placed in oven to given temperature (not pressure formed), cooled at 10° C./min
AC = Air cool = cooled press with flowing air and water as cooling reate = 4° C./min
A/WC = Air/water cool - cooled press with flowing air and water as cooling media, cooling rate = 9° C./min
O/NC = Overnight left cool = no cooling medium. plaque left in press overnight, cooling rate = 1° C./min
QC = Quench cool = cool = plaque taken out of press at $T_m$ and placed between aluminum plates, cooling rate = 30–40° C./min
RC = Restrained Quench = plaque taken out of press at $T_m$ and placed between insulating medium
[2,3,4]UNITS:
$O_2$ = cc(STP)-mil/100 sqin-d-atm
$CO_2$ = cc(STP)-mil/100 sqin-d-atm
Hfus(1) = Heat of fusion on first DSC scan = cal/gm It should be noted that measurements of melting points and crystallization temperatures, or alternatively heats of melting and heats of fusion, for polymers prepared herein were made by the use of a Perkin-Elmer DSC 7 differential scanning calorimeter (DSC) which employs samples of polymer or polymer composition in sealed pan containers. The pan and contents are heated at a controlled rate, typically 20° C./minute, until the sample has melted. The pan and contents are then cooled until the sample has solidified and then heated again, past a second melting point, to 285° C. at which temperature the sample is maintained for 10 minutes. The pan and contents were then cooled until the sample has solidified a second time. The melting and crystallization temperatures are defined as the temperatures at which the heat flow reaches a maximum (for melting) or a minimum (for crystallization). Typically the melting point, Tm, will be higher than the crystallization temperature, Tc.

TABLE VI

Controlled Cooling Experiments

| Polyketone Polymer | Cooling Protocol | t(mils) | $O_2$ | $CO_2$ | $H_2O$ | Hfus(1)[7] | % Crystallinity |
|---|---|---|---|---|---|---|---|
| 055/022 | ice[1] | 10.5 | 7.25 | 49.1 | — | 19.0 | 0.333 |
| 055/022 | ice[2] | 10.7 | 6.00 | 42.9 | 10.9 | 19.4 | 0.340 |
| 055/022 | ice[3] | 11.8 | 5.31 | 37.2 | 17.9 | 17.6 | 0.309 |
| 055/022 | Al plate[4] | 10.4 | 3.43 | 28.9 | 6.9 | 21.4 | 0.375 |

TABLE VI-continued

| | | Controlled Cooling Experiments | | | | | |
|---|---|---|---|---|---|---|---|
| Polyketone Polymer | Cooling Protocol | t(mils) | $O_2$ | $CO_2$ | $H_2O$ | Hfus(1)[7] | % Crystallinity |
| 055/022 | Al plate[5] | 10.5 | 3.57 | 26.7 | — | 21.0 | 0.368 |
| 055/022 | teflon TM[6] plates | 9.8 | 1.86 | 16.7 | — | 22.0 | 0.386 |

[1] This cooling was in an ice bath at a rate of 20° C. per minute
[2] This cooling was in an ice bath at a rate of 20° C. per minute
[3] This cooling was in an ice bath at a rate of 20° C. per minute
[4] This cooling was in a controlled water bath at a rate of 10° C. per minute
[4,5] Al plate quench involves disposing the polyketone polymer between two metal plates and cooling at a rate of 10°C. per minute
[6] This cooling involved disposing the polyketone polymer between two teflon TM plates and cooling at a rate of less than 5° C. per minute
[7] Heat of fusion expressed in cal/gram The following general observations were made:

I. There appears to be good results using compression molding temperature 5°-15° C. above the resin melting point (indicated by DSC). 15° C. above the resin m.p. appears to be the best.

II. A moderate cooling rate between 6° C.-10° C. per minute from the melt appeared to yield good results.

Based on these and other studies, it has been determined that moderate cooling rates work best to improve barrier properties of heated polyketone polymers.

In another test run using a polyketone terpolymer 55/005 with a m.p. of 218° C. with a 1.7 LVN, that had been heat treated at 15° C. above the melting point of the terpolymer then cooled in an air or water bath at 10° C. per minute, yielded a very good permeability value for $O_2$ 1.22. This moderate cooling rate was compared with cooling quickly cooling the same polymer heated to the same degree (via quenching in ice) at a rate of 20° C. per minute which yielded a P-$O_2$ of 5.46. Cooling the same heat treated polymer more slowly, at a rate of 5° C. per minute in an air or water bath, providing a P-$O_2$ of 1.78. Cooling this heat treated polymer at a rate of 1° C. per minute in an air or water bath yielded a P-$O_2$ of 2.44, wherein P-$O_2$ is expressed in cc mil/100sqin-d-atm.

Additional components may optionally be added to the formulation to enhance certain properties of the material or reduce the cost for preparing the film. It is contemplated that additional hardeners, fillers, extenders, fortifiers, carriers, nucleating agents, agents to improve the amorphous density of the polymeric material, preservatives of the type known to the art, and mixtures thereof may be added.

The novel barrier film, can be disposed on a variety of substrates, such as a different polymer like polypropylene or on aluminum, mild steel, cold roll steel or teflon.

Suitable applications of the novel barrier films of this invention are in the fields of packaging, such as film or sheet materials usable to contain food, injection molded or blow-molded containers, and the like.

What is claimed is:

1. A process for preparing a melt processed polymer material having improved oxygen, water or carbon dioxide barrier properties comprising the steps of:
   (a) melt processing a quantity of a linear alternating polymer of carbon monoxide and at least one ethylenically unsaturated hydrocarbon to form a film wherein said polymer is of the formula

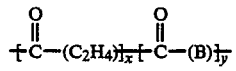

wherein B is the moiety of an ethylenically unsaturated α-olefin of at least 3 carbon atoms polymerized through the ethylenic unsaturation and the ratio of y:x is no more than about 0.5;
   (b) heating said melt processed film to a temperature ranging from about 2° C. to about 40° C. above the melting point of the polymer; and
   (c) cooling said heated melt processed film at a moderate rate between about 6° C. and about 10° C. per minute to form a melt processed polymer material.

2. The process of claim 1 wherein y is zero.

3. The process of claim 1, wherein after cooling said heated melt processed film at a moderate rate, said melt processed polymer material is reheated to a temperature in the range from the melting point of the polymer to about 20° C. below the melting point of the polymer and recooled at a moderate cooling rate between about 6° C. and 10° C. per minute.

4. The process of claim 1, wherein said heating of said melt processed film is at a temperature ranging from about 2°-25° C. above the melting point of the polymer.

5. The process of claim 1, wherein the α-olefin is propylene and the ratio of y:x is from about 0.01 to about 0.2.

6. The process of claim 1, wherein said heating of said melt processed film is at a temperature of about 15° C. above the melting point of the polymer.

7. The process of claim 1, further comprising the step of adding to the polymer prior to melt processing, a member selected from the group consisting of:
   a filler, a hardener, an extender, a fortifier, a carrier, a preservative, a substance to enhance the amorphous density of the polymer material, a nucleating agent and mixtures thereof.

* * * * *